Jan. 7, 1969  R. PESCHEK  3,420,103
LIQUID LEVEL INDICATOR
Filed Feb. 13, 1967
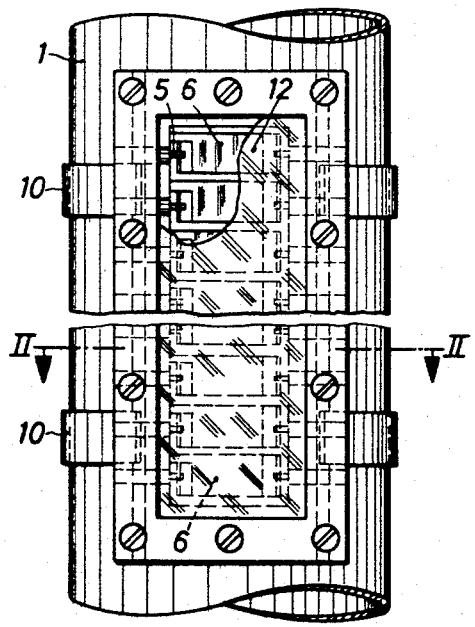
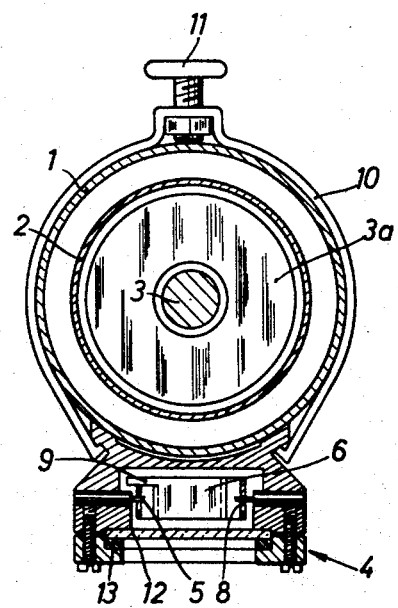
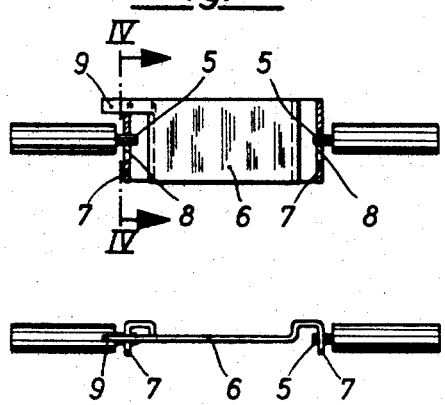
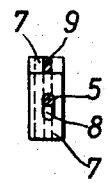
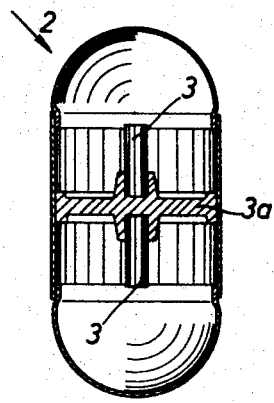
Inventor
Robert Peschek
By Richard Clyde
Ag't

United States Patent Office 3,420,103
Patented Jan. 7, 1969

3,420,103
LIQUID LEVEL INDICATOR
Robert Peschek, Frankfurt am Main, Germany, assignor to Phönix Armaturen Werke Bregel G.m.b.H., Frankfurt am Main, Germany, a company of Germany
Filed Feb. 13, 1967, Ser. No. 615,584
Claims priority, application Germany, Feb. 19, 1966, P 38,821
U.S. Cl. 73—319                         3 Claims
Int. Cl. G01f 23/06

ABSTRACT OF THE DISCLOSURE

A liquid level indicator in which plates of magnetizable material are mounted on pivot pins arranged in two vertical rows, two coaxial pins of the respective rows engaging elongated slots of an associated plate. The center of gravity of the plate is located between the two parallel planes defined by the pin axis in the two terminal positions of the pins in the slots. The plates are turned and shifted on the pins by a magnet floating on the liquid when the liquid level changes.

BACKGROUND OF THE INVENTION

*Field of the invention*

The invention relates to liquid level indicators, and particularly to an indicator in which vertically offset plates of magnetizable material are mounted for pivoting movement about horizontal axes and are turned about their axes by a magnet which floats on the liquid and moves vertically past the plates to turn the same about their axes when the liquid level changes.

*Description of the prior art*

Known devices of the type described have two vertical rows of pivot pins, and each indicating plate is pivotally mounted between two associated coaxial pins of the two rows respectively. The plates are made of steel containing enough carbon to retain some magnetism after being approached by the floating magnet. The pivot axis of the two associated pins passes approximately through the center of gravity of each plate.

When the magnet vertically moves past to a plate in the known device, the plate is turned about its axis by the attraction of the magnet and is thereafter held in the new position by its remanent magnetism and that of adjacent plates.

The remanent magnetism of the plates decays gradually. If the liquid level remains relatively stable for an extended period, and the magnet does not approach some of the plates during that period, any forces accidentally exerted on the plates may turn them from the desired indicating position against the insufficient restrain of the still available magnetic forces.

The two faces of the plates are provided with contrasting indicia, for example, coats of paint of different color. The plates jointly form a column whose portion above the level of the magnet is different in color from the column portion below the magnet as long as the plates are retained in their positions by remanent magnetism. If that magnetism is permitted to decay, they gradually assume random positions and a reliable level reading can no longer be made.

The invention aims at improving the afore-described device in such a manner that the position of each plate established by the floating magnet remains unchanged thereafter for any desired length of time even if the liquid level remains stationary and if the level indicating apparatus is subjected to random mechanical forces, for example, to vibration.

SUMMARY OF THE INVENTION

The desired improvement is brought about by providing each indicating plate with two elongated slots which pivotally receive the associated pins and permit relative sliding movement of the pins longitudinally of the slots and transversely of their common axis between two terminal positions in which the axis defines two parallel planes, the center of gravity of the plate being located between the planes, but spaced from the planes.

The plate is therefore held by gravity in two positions offset about 180° about the pivot axis when the pivot pins assume the two terminal positions in the slots. The length of the slots is readily selected so that the plates are safely held in position against the most severe extraneous forces exerted on them by vibration or like effects.

Remanent magnetism is not involved in maintaining the position of the plates, and the plates may therefore be made of soft iron practically free of carbon, and free of remanent magnetism. Such plates are more readily attracted by the floating magnet.

BRIEF DESCRIPTION OF THE DRAWING

FIG. 1 shows a liquid level indicator of the invention in front elevation;

FIG. 2 illustrates the indicator of FIG. 1 in plan section on the line II—II;

FIG. 3 shows an indicating plate of the indicator of FIG. 1 with the associated pivot pins in front-elevational section on the pivot axis;

FIG. 4 shows the device of FIG. 3 in side-elevational section on the line IV—IV;

FIG. 5 is a top plan view of the device of FIG. 3; and

FIG. 6 shows the float of the indicator in elevational section.

DESCRIPTION OF THE PREFERRED EMBODIMENT

Referring initially to FIGS. 1 and 2, there is seen an upright cylindrical tube 1 which communicates with the vessel (not shown) whose liquid level is to be indicated. A float 2 is coaxially guided in the tube 1 in a manner not illustrated and carries two aligned strong bar magnets 3 mounted in common support 3a, as shown in FIG. 6. A channel 4 is attached to the tube 1 by several straps 10 provided with clamping screws 11 in parallel alignment with the tube axis. The channel 4 is approximately U-shaped in cross section, as best seen in FIG. 2, and its open side faces radially outward and is sealed by a glass plate 12 which is held in position by a gasket 13.

Two rows of horizontal pivot pins 5 extent inward through the flanges of the channel 4. Each pin 5 of one row is coaxially aligned with a pin of the other row, and each pair of aligned pins 5 supports an indicating plate 6. As is evident from joint consideration of FIGS. 3 to 5, each plate 6 is an integral piece of sheet material, each of two opposite end portions of which is bent into the approximate shape of a short and very shallow U-channel section. The pins 5 are slidably and rotatably received in respective elongated slots 8 in the flanges 7 of the channel section.

The slots 8 are positioned in such a manner that the center of gravity of the plate 6 is located between two parallel planes passing perpendicularly through each of the axes of the pins 5 in the two extreme or terminal positions of the pins 5 in the slots 8 so that the plate 6 is held by gravity in either of two positions on the pins 5, the two positions being offset approximately 180° relative to each other. In other words, if the pins are exactly midway between the terminal positions, the common axis of the pins is coaxial with the horizontal axis through the center of gravity of the respective plate. A portion 9 of the plate 6 forms an integral abutment which may engage an internal wall of the channel 4 and thus limits rotary movement of the plate 6.

The apparatus illustrated is made of brass, aluminum, or other non-magnetic material with the exception of the plates 6 which consist of soft iron, and of the magnet 3. The two faces of the plate 6 are painted in contrasting colors (not shown).

The afore-described liquid level indicator operates as follows:

When the liquid level in the non-illustrated vessel and in the tube 1 sinks, the magnet 3 descends axially in the tube. When it passes a plate 6 which is in the vertical position shown in FIGS. 3 to 5, the plate is pivoted about the common axis of the pins 5 until it is horizontal, as shown in FIG. 2, and slides on its pins 5 toward the magnet 3. As the magnet further descends, the plate 6 turns further. When the attraction of the retreating magnet ultimately is not sufficient to overcome the force of gravity on the plate 6, the plate slides to a stable position offset 180° from that shown in FIG. 3. When the magnet 3 rises in the tube 4, the plate 6 is returned to the initial position in an analogous manner as it is being passed by the magnet.

If the two faces of the plates 6 are painted black and white respectively, and if the white face is directed outward in the position of FIG. 4, the several vertically juxtaposed plates shown in FIG. 1 show their white faces below the axial position of the magnet 3 and the black faces above that level.

The plates maintain their angular position even if they are subjected to vibration or other extraneous influences which cannot overcome the force of gravity in the indicating positions of the plate.

I claim:
1. A liquid level indicator comprising
   (a) a float having a magnet floating on liquid the level of which is to be indicated,
   (b) a plurality of indicating plates of magnetizable material, said plates being supported one above the other in a general plane which intersects the field of said magnet while moving as the liquid level changes,
   (c) two rows of pivot pins,
      (1) each of the pivot pins of one of said rows coaxially extending toward a pin of the other row and thus forming with said pivot pin of said other row a pair of associated coaxial pins,
      (2) each of said plates being pivoted on opposite ends on a pair of associated pins to turn about its transverse axis, and having its center of gravity in said axis, and
   (d) means on each of said plates for defining two elongated slots on said opposite ends, said slots receiving a pair of associated pins for said pivotal support, and for a sliding support, of the respective plate,
      (1) each of said plates being adapted to slide longitudinally of the respective slots between two stable terminal positions approximately 180° relative to each other, and being supported during its pivoting movements when inclined toward said magnet, due to gravity, in one of said stable terminal positions,
      (2) each of said plates when gravitationally in a stabilized horizontal condition, with the respective supporting pair of associated pins in a position between said terminal positions, being slidingly urged by the force of said magnet into one of said stable terminal positions.

2. In the indicator according to claim 1, portions of each of said plates on said opposite ends being U-shaped, the slots of each of said plates being provided in the terminal legs of said U-shaped portions.

3. In an indicator as set forth in claim 1, said magnetizable material being soft iron.

References Cited

UNITED STATES PATENTS

| 2,920,484 | 1/1960 | Reichert | 73—319 |
| 3,226,848 | 1/1966 | Peterson | 35—32 |

FOREIGN PATENTS

| 360,220 | 2/1962 | Switzerland. |
| 363,816 | 8/1962 | Switzerland. |

S. CLEMENT SWISHER, *Primary Examiner.*

D. M. YASICH, *Assistant Examiner.*